Dec. 5, 1944.　　A. J. SCHREIBER　　2,364,478
WORK SUPPORT
Filed May 29, 1942　　2 Sheets-Sheet 1

Inventor
Albert J. Schreiber
By Barthel & Bugbee
Attorneys

Dec. 5, 1944. A. J. SCHREIBER 2,364,478
WORK SUPPORT
Filed May 29, 1942 2 Sheets-Sheet 2

Inventor
Albert J. Schreiber
By
Barthel & Bughu
Attorneys

Patented Dec. 5, 1944

2,364,478

UNITED STATES PATENT OFFICE 2,364,478

WORK SUPPORT

Albert J. Schreiber, Grosse Pointe Farms, Mich., assignor to Square Tool, Die & Mfg. Co., Warren, Mich., a corporation of Michigan Application May 29, 1942, Serial No. 445,098

10 Claims. (Cl. 90—58)

The present invention relates to work supports and more particularly to a rotatable work support.

The primary object of the invention is to provide a work support capable of being placed upon a machine bed or table so that the work may be presented to a tool at different angles relatively thereto.

A further object of the invention is to provide a work holder and support capable of being detachably secured to a machine bed whereby the work may be clamped to the rotatable support to facilitate the ease of manipulation of the work during successive machine tool operations.

A further object of the invention, is to provide a rotatable work support adapted to be adjusted to various angles and locked so as to position the work correctly when the work is presented to the machine tool.

A further object of the invention, is to provide a work holder having a turret support which may be minutely adjusted by means of vernier adjustment coupled with the turret support so as to move the work table to various radial positions.

Other objects and advantages of the invention will become apparent during the course of the following description of the accompanying drawings wherein.

Figures 1, 2:
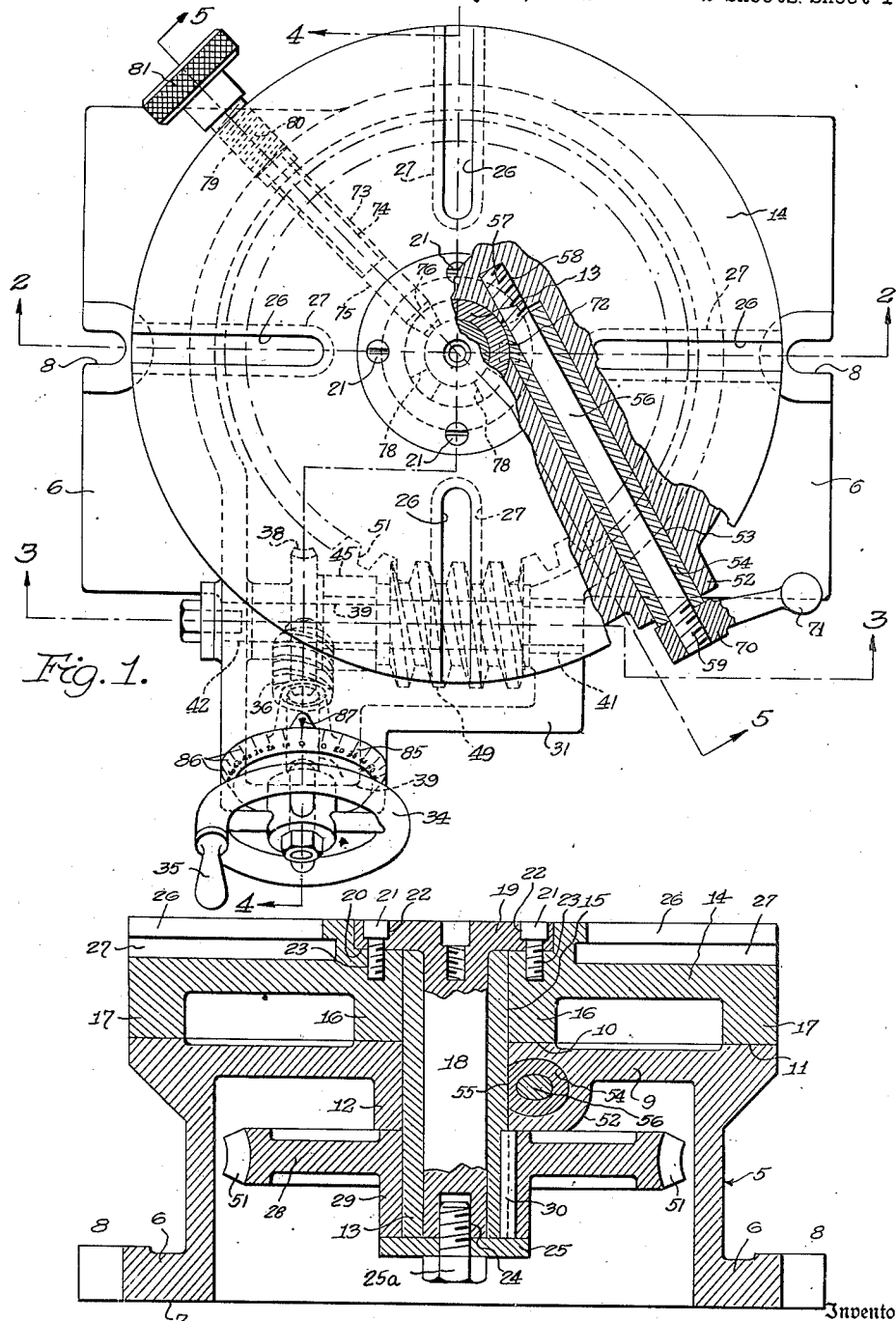
Fig. 1 is a top plan view showing a portion thereof broken away to illustrate the table locking device.
Fig. 2 is a transverse cross-sectional view taken on line 2—2 of Fig. 1, looking in the direction of the arrows illustrating in detail the manner in which the rotatable work support is secured to the base.
Figure 4:
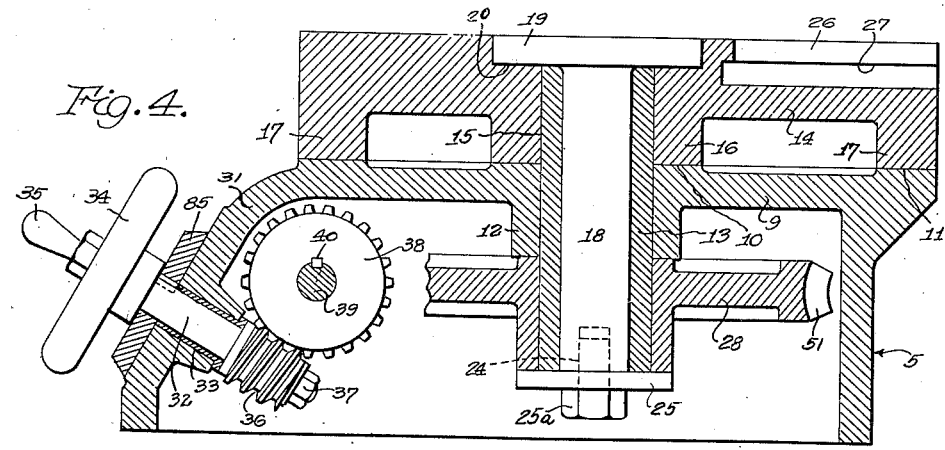
Figure 5:
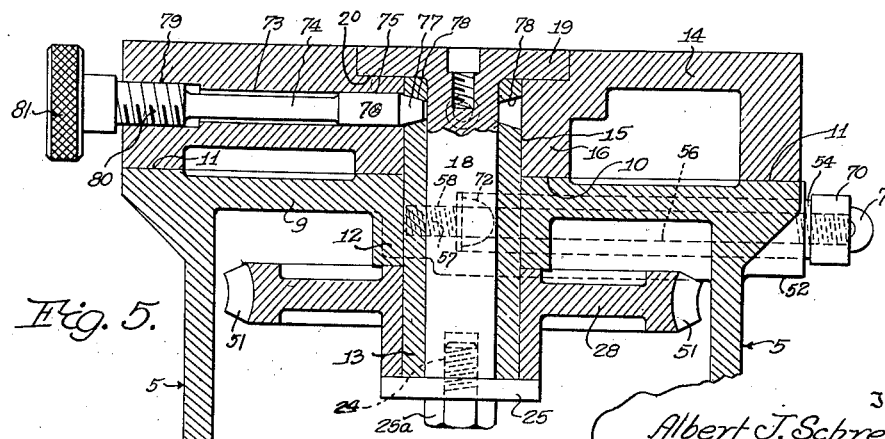

Fig. 4 is a vertical cross-sectional view taken on the line 4—4 of Fig. 1, looking in the direction of the arrows illustrating in detail the location of the vernier adjustment and the general formation of the base, and Fig. 5 is a vertical cross-sectional view taken on the diagonal line 5—5 of Fig. 1, looking in the direction of the arrows, illustrating the detail of the construction and arrangement of the rotary table connecting pin.

In the drawings wherein for the purpose of illustrating the invention and wherein like reference characters will be employed to designate like parts throughout the same, the reference character 5 will generally be employed to designate a substantially circular base having diametrically disposed wings 6 at the bottom thereof, the lower wall which, as at 7, is formed substantially flat to provide a relatively plane surface adapted to be positioned upon the bed of a machine tool. The wings 6 are notched as at 8 for receiving tie-down bolts carried by the machine bed whereby said base may be positioned in various locations with respect to said base.

The upper portion of the cylindrical base 5 is provided with a top wall 9 having an inner circular boss 10 and an outer concentric circular boss 11. Depending from the top wall 9 is a tubular bearing member 12 which is formed integral with the top wall and is adapted to provide a vertical bearing for a tubular spindle 13 which projects therethrough and extends above the top wall 9 and a considerable distance within the base 5.

Rotatably mounted upon the top wall 9 is a turret work support 14 having a central opening 15 around which is formed a circular boss 16 having its lower face in contactual engagement with the circular boss 10. Likewise, an outer concentric annular boss 17 is formed integral with the turret work support 14 and has its lower face engaging the face of the concentric boss 11. It will be noted that the tubular spindle 13 extends into the bearing 15 of the turret work support 14 and that a coupling pin 18 extends through the tubular spindle 13 and is provided at one end with a relatively large circular head 19. Said head is adapted to be received in a circular opening 20 in the top walls of the turret work support 14 and machine screws 21 are countersunk in the head 19, as at 22, and have their opposite ends threaded in threaded openings 23 equi-distantly spaced around the central opening 15.

The lower end of the connecting pin 18 is provided with a threaded opening 24 for receiving a machine screw 25ª which is adapted to draw the washer 25 upwardly against the lower edge of the tubular spindle 13.

The turret work support table 14 is provided with radially extending slots 26 enlarged as at 27 for receiving a T-head bolt to facilitate the clamping of the work thereto and it will be noted that the work may be bolted so that it is centered with respect to the pin 18 or the work may be offset eccentrically thereof.

Figure 3:
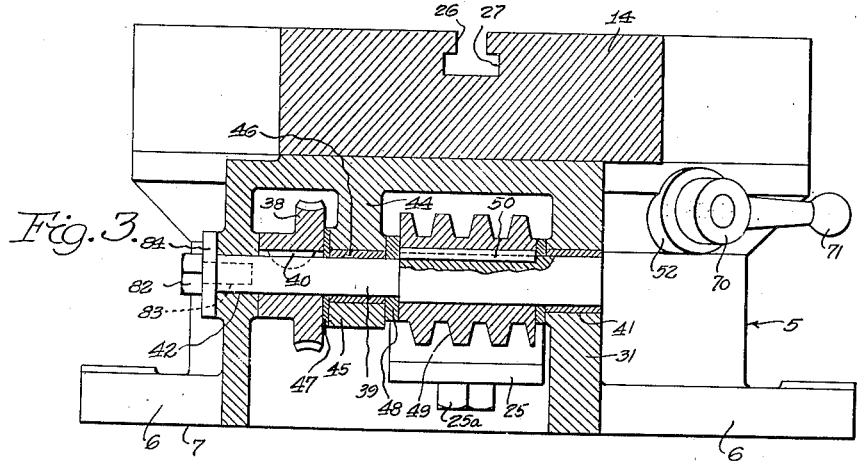
Fig. 3 is a transverse cross-sectional view taken on line 3—3 of Fig. 1, looking in the direction of the arrows illustrating the gearing for supporting rotation to the work support.

Interposed between the circular boss 12 and the washer 25 is a worm wheel 28, the hub of which as at 29 being keyed by means of a key 30 to the lower end of the tubular spindle 13 whereby rotation of the worm wheel 28 will effect the rotation of the tubular spindle within the depending bearing 12. Journaled in an offset portion 31 of the base 5 is a rotary shaft 32 mounted in a suitable bearing 33 extending therethrough and one end of said shaft is provided with a hand wheel 34 having a handle 35 while the inner end of the shaft 32 is provided with a worm 36 held in place by means of a nut or the like as at 37 threaded on the end thereof. A worm wheel 38 is mounted directly above the worm 36 and is in mesh therewith so that rotation of the hand wheel 34 will likewise effect rotation of the worm wheel 38. The worm wheel 38 is keyed to a shaft 39 by means of a suitable key or the like 40 and said shaft 39 is journaled as at 41 in one of the side walls of the offset portions 31 while the opposite end is journaled as at 42 in an opposite wall of the offset portion 31. The shaft 39 is further supported by a depending gear bracket 44 having formed on the lower end thereof a bearing 45 having a suitable bearing member 46 for receiving the shaft 39. Thrust washers 47 and 48 are located on opposite sides of the depending bearing 45 so that the gear 38 will be confined between one wall of the offset housing 31 and the depending bearing bracket 44, as is clearly shown in Fig. 3.

Keyed to the shaft 39 is a worm 49 secured against rotation by means of a locking key 50 and said worm 49 is confined between the opposite wall of the offset casing portion 31 and the depending bearing bracket 44. The worm 49 is adapted to mesh with the teeth 51 formed on the periphery of the worm wheel 28 so that the rotation of the turret work holder 14 may be effected by manually rotating the hand crank 35.

Formed on the underside of the top wall 9 is a tubular way 52 having a central opening 53 for slidably receiving a locking sleeve 54. The central opening 53 is formed tangential to the depending bearing 12 and in communication with the interior of the opening formed by said bearing portion 12 at a point indicated at 55. Extending longitudinally through the locking sleeve 54 is a control rod 56 the inner end of which is threaded as at 57 for being received in a correspondingly threaded opening 58 formed at the end of the central opening 53. The outermost end of the locking rod 56 is threaded as at 59 for receiving a collar 70 having a radially extending manual control lever 71 to effect a tightening action upon the locking sleeve 54 so that the inner curved end 72 will frictionally engage the cylindrical spindle 13 and lock the same against rotation. Turning of the manual control lever 71 will cause the collar 70 to be tightly threaded or to be threaded upon the end of the rod 69 thereby moving the locking sleeve 54 inwardly since the inner end of the rod 56 is anchored in the threaded opening 58 formed at the end of the central bore 53.

The rotary turret head 14 is provided with a radially extending bore 73 for slidably receiving a locking bolt 74. One end of the radial bore 73 is reduced, as at 75, for receiving a slightly enlarged portion or head 76 formed on the locking rod 74. The extreme inner end of the head 76 is tapered as at 77 and is adapted to enter equi-distantly spaced openings 78 formed on the upper end of the tubular spindle 13. Said openings 78 are preferably arranged at 90° locations so that the turret work support 14 may be shifted rotationally to these positions. The outer end of the radial bore 73 is enlarged as at 79 and screw-threaded for receiving a screw threaded portion 80 formed on the locking rod 74. The extreme outer free end of the locking rod 74 is provided with a knurled thumb piece 81 to allow the rotation of the locking rod 74 and the withdrawing of the head 76 by the threading action of the cooperating portions 79 and 80.

Displacement of the shaft 39 will be prevented by providing a bolt or the like, as at 82, having its threaded portion extending into a threaded opening 83 in the end of the shaft 39 so that a washer 84 may prevent the shaft 39 from moving in its feeding direction. Since the worm wheel 38 and worm 49 are keyed to the shaft 39, movement in the opposite direction is prevented by the end wall of the casing extension 31 and the depending bearing bracket 44.

In operation, the base 5 is bolted or otherwise secured to the bed on a machine tool in the desired position or location. The work is then bolted to the rotary turret head 14, likewise in the desired position. Rotation of the head 14 may be effected by rotating the handle 34 so that the dial 85 carried by the shaft 32 and keyed thereto will have its graduations 86 brought into registry with the marking 87 formed on the offset wall 31. By manipulating the hand wheel 34 in accordance with the graduations 86 on the dial 85, the rotary head 14 may be brought into any desired angular position, as indicated on the dial 85 by the degree marks thereon. After the rotary head 14 has thus been adjusted by manipulation of the hand wheel 34, it may be locked in this position by means of the manual control lever 71 to lock the tubular spindle 13 against rotation relative to the base 5.

Should it be desired to shift the work with respect to the machine tool it is simply necessary to withdraw the locking rod 74 so that the tapered end 77 is removed from one of the openings 78. By rotating the head 14 on the spindle 13 to another position wherein the tapered end 77 will register with another opening 78 the work may be moved to a right angle position from its initial position so that further adjustment of the hand wheel 34 and rotation of the head 14 may be carried out by accurately positioning the work with respect to the machine tool.

It is to be understood that the form of the invention herewith shown and described is to be taken as a preferred embodiment of the same and that various changes in the shape, size and arrangement of parts may be resorted to without departing from the spirit of the invention or the scope of the subjoined claims.

What I claim is:

1. A work support, comprising a base, a sleeve rotatably mounted in said base, a rotatable head carried by the base and rotatable about said sleeve, means for rotating said sleeve and means for drivingly coupling the rotating means and sleeve to the head.

2. A work support, comprising a base, a sleeve rotatably mounted in said base, a rotatable work supporting head carried by the base and rotatable about said sleeve, means for rotating the sleeve, means for locking the sleeve against rotation and means for operatively coupling the rotating means and sleeve to the head whereby said head may be rotationally adjusted independently of said rotating means.

3. A work support, comprising a base, a sleeve rotatably mounted in said base, a rotatable work supporting head carried by the base and rotatable about the axis of the sleeve, manual control means for rotating said sleeve, a locking member carried by the base for preventing rotation of said sleeve, means for rotating said sleeve and means for selectively inter-connecting the rotating means and sleeve to said head for drivingly connecting said head to said means for rotating said sleeve.

4. A work support, comprising a base, a sleeve rotatably mounted in said base, a rotatable work support carried by said base and rotatable about said sleeve, a spindle connecting the head and extending through said sleeve to center the head relative to said base, means for rotating the sleeve and means carried by the head for selectively and drivingly connecting the head to the sleeve.

5. A work support, comprising a base, a sleeve journaled in said base, a rotatable work support carried by said base and rotatable about the axis of said sleeve, a spindle connecting the head and extending through said sleeve to center the head relative to the base, means for rotating the sleeve, means for selectively and drivingly connecting the head to the sleeve, and means carried by the base for locking the sleeve and head to the base.

6. A work support, comprising a base, a cylindrical support journaled in said base, a rotatable work support carried by said base and rotatable about said cylindrical support, a spindle connecting the head and extending through said sleeve to center said head on the base, means for rotating the spindle, means for selectively and drivingly connecting the head to the sleeve, and a locking rod extending through the head for clamping engagement with said sleeve for locking the head against rotation relative to the base.

7. A work support, comprising a circular base, a sleeve rotatably journaled in said base, a rotatable work supporting head carried by the base and rotatable about said sleeve having radially extending bolt receiving slots to facilitate the fastening of work thereto, a spindle connected to the head extending through the sleeve in said base and head, means for rotating the sleeve, means for selectively and drivingly locking the head to the sleeve and means carried by the base engageable with said sleeve to lock the head relative to the base in a predetermined position.

8. A work support, comprising a circular base, a sleeve rotatably mounted in said base, a rotatable work supporting head carried by the base and rotatable about said sleeve having radially extending bolt receiving slots to facilitate the fastening of work thereto, a spindle extending through the sleeve in the base and connected to said head to center the head on the base, means for rotating the sleeve, means for selectively locking the head to and engageable with the rotated sleeve, and a locking sleeve carried by the base extending tangentially to the spindle for locking the head and sleeve against rotation in a predetermined position.

9. A work support, comprising a circular base, a disk-shaped work support rotatably mounted on the base, a tubular spindle rotatably mounted in said work support and extending through said base, a pivot pin connected to said disk-shaped work support and extending into the tubular spindle carried by the disk-shaped work support, means for rotating the tubular spindle, and means for selectively locking the tubular spindle to the disk-shaped work support whereby said work support may be adjusted to a predetermined position by the spindle rotating means and then moved to another predetermined position by manipulating the locking means.

10. A work support, comprising a circular base, a disk-shaped work support rotatably mounted on the base, a tubular spindle rotatably mounted in said base and extending through said disk-shaped work support, a pivot pin connected to said disk-shaped work support and extending into the tubular spindle to center the work support on the base, means for rotating the tubular spindle, means in the work support for selectively locking the tubular spindle to the disk-shaped work support, and means in the base for locking the tubular spindle and disk-shaped work support against rotation whereby said disk-shaped work support may be adjusted to a predetermined position and locked and said selective locking means may be manually manipulated to shift said disk-shaped work support to another predetermined position.

ALBERT J. SCHREIBER.